United States Patent [19]

Yui et al.

[11] 4,451,422
[45] May 29, 1984

[54] METHOD FOR PRODUCING POLYETHYLENE TEREPHTHALATE PACKING MATERIAL

[75] Inventors: Ryosuki Yui; Ketsuke Kume; Masaaki Hashi, all of Neagarimachi; Junji Niikura, Kanazawa, all of Japan

[73] Assignee: Sekisui Jushi Kabushiki Kaisha, Osaka, Japan

[21] Appl. No.: 372,543

[22] Filed: Apr. 28, 1982

Related U.S. Application Data

[63] Continuation-in-part of Ser. No. 210,859, Nov. 26, 1980, abandoned.

[30] Foreign Application Priority Data

Nov. 30, 1979 [JP]  Japan ............................. 54-155753
Mar. 3, 1980 [JP]  Japan ............................. 55-26885

[51] Int. Cl.³ ................................................ B29D 7/24
[52] U.S. Cl. ........................... 264/178 R; 264/178 F; 264/210.7; 264/210.8; 264/235.6; 264/284; 264/289.6; 528/272
[58] Field of Search ............ 264/210.7, 178 R, 178 F, 264/289.3, 289.6, 235.6, 210.8, 284; 528/309, 272

[56] References Cited

U.S. PATENT DOCUMENTS

| | | | |
|---|---|---|---|
| 3,432,591 | 3/1969 | Heffelfinger | 264/289.6 |
| 3,447,207 | 6/1969 | Danzer | 264/210.7 |
| 3,461,199 | 8/1969 | Campbell | 264/289.6 |
| 3,739,056 | 6/1973 | Evans et al. | 264/290.2 |
| 3,842,152 | 10/1974 | Witfield, Jr. et al. | 264/210.7 |
| 3,966,867 | 6/1976 | Munting | 264/210.7 |
| 4,022,863 | 5/1977 | Karass et al. | 264/210.7 |
| 4,042,569 | 8/1977 | Bell et al. | 264/210.7 |
| 4,101,625 | 7/1978 | Haley | 264/210.7 |

FOREIGN PATENT DOCUMENTS 2526844  1/1976  Fed. Rep. of Germany ... 264/210.7

*Primary Examiner*—Jeffery R. Thurlow
*Attorney, Agent, or Firm*—Armstrong, Nikaido, Marmelstein & Kubovcik

[57] ABSTRACT

A polyethylene terephthalate packing band is provided which is made of a polyethylene terephthalate resin having an intrinsic viscosity of 0.90 to 1.20 and has been longitudinally stretched to an overall draft of 3 to 6 times. There is also provided a packing band of the above construction in which the longitudinal orientation of the resin molecules has been randomized by embossing. There is further provided a method by which the above-mentioned packing band is efficiently manufactured.

2 Claims, 1 Drawing Figure

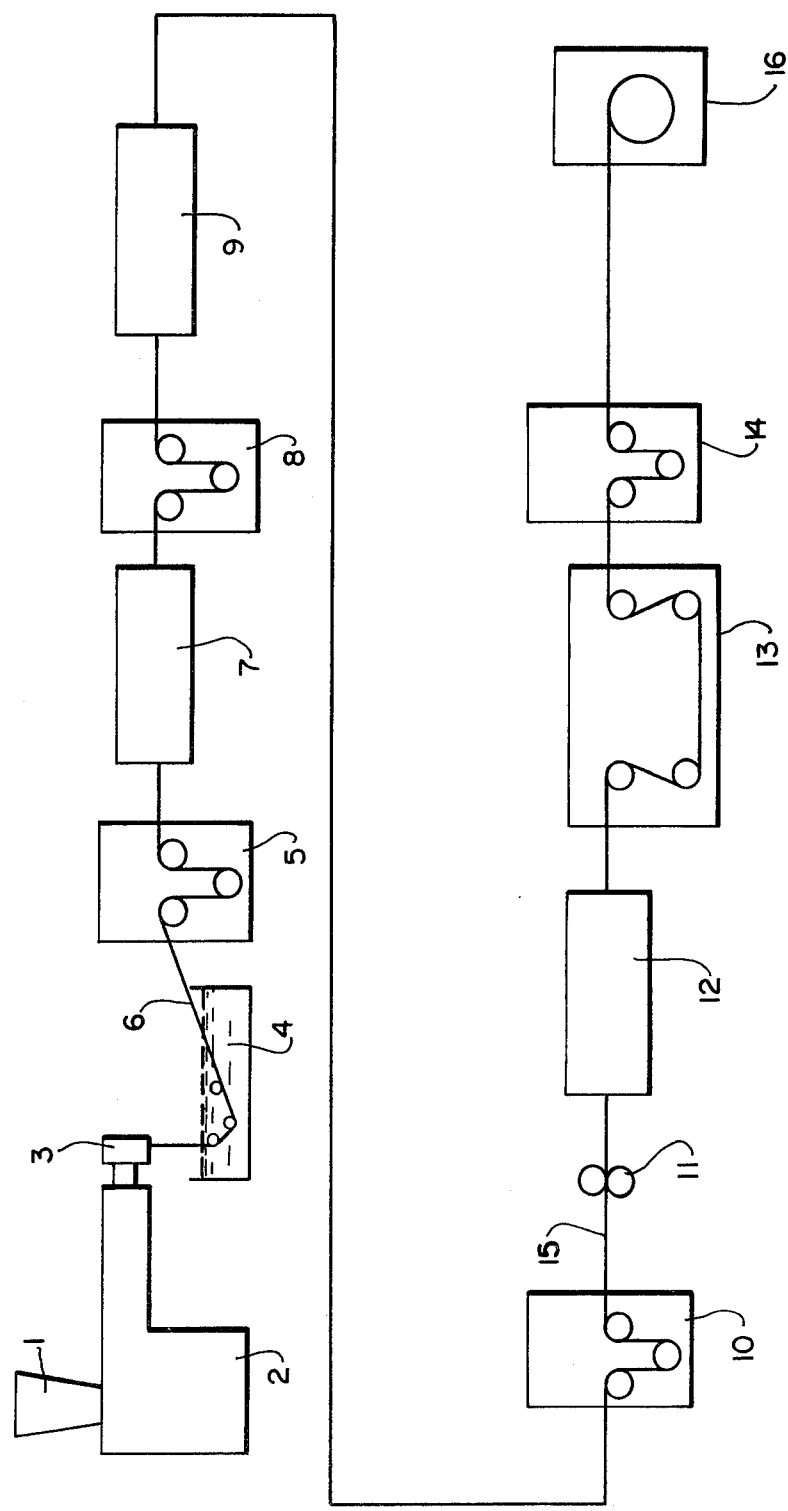

METHOD FOR PRODUCING POLYETHYLENE TEREPHTHALATE PACKING MATERIAL

CROSS-REFERENCE TO RELATED APPLICATION

This is a continuation-in-part of our copending application Ser. No. 210,859, filed Nov. 26, 1980 and now abandoned.

BACKGROUND OF THE INVENTION

1. Field of the Invention

This invention relates to a new polyethylene terephthalate packing band and a method of producing the same.

2. Description of the Prior Art

As a bundling material for heavy products, there have been available bands and strips of natural or synthetic fiber or of steel. The former type of band or strip has the disadvantages of unpacking due to release of stresses following the bundling operation, breakage due to insufficient knot strength and so on. The latter material has the problem of corrosion, the danger involved in manipulation at packing and so on.

As an alternative packing material, there has been proposed a packing material of polyethylene terephthalate resin. The hitherto-available polyethylene terephthalate bands are generally made by one-stage stretching and are based on polyethylene terephthalate resins with intrinsic viscosity values not over 0.90. These bands have the following and other disadvantages:

(a) Insufficient strength;
(b) Poor heat sealability with variations in the quality of seal;
(c) High shrinkage at elevated temperature, which prevents use in high-temperature environments; and
(d) Poor weathering quality.

Two-stage stretching of polyethylene terephthalate has been proposed, but many of the past proposals are aimed at increasing the transparency of film and the products have the problem of longitudinal cracking in addition to the above-mentioned disadvantages.

The present inventors have found that the above disadvantages of the prior art polyethylene terephthalate packing materials are emergent from improper material resin viscosity and the conditions used for two-stage stretching. This invention has been accomplished on the basis of the above findings and ensuing studies.

OBJECTS AND SUMMARY OF THE INVENTION

It is an object of this invention to provide a polyethylene terephthalate packing material which withstands prolonged storage under outdoor conditions or in a high-temperature (50° to 80° C.) environment.

It is another object of this invention to provide a polyethylene terephthalate packing material having improved heat seal strength and material strength.

It is still another object of this invention to provide a method for producing the packaging material mentioned above and described more fully hereinafter.

BRIEF DESCRIPTION OF THE DRAWING

The accompanying drawing is a schematic diagram illustrating the method of this invention for the production of a polyethylene terephthalate packing band.

DETAILED DESCRIPTION OF THE INVENTION

The packing material according to this invention is made of a polyethylene terephthalate resin. The raw material polyethylene terephthalate resin has an intrinsic viscosity (IV) of 0.90 to 1.20. To manufacture the packing band of this invention, the above resin is first dried in a dehumidification-drying hopper (1) of an extruder at a temperature of about 150° C. for about 4 hours until its moisture content is up to 0.02 percent, and then is melt-extruded from a die (3) through a cylinder set to a temperature of 240° to 285° C. The resin melt thus extruded is cooled in a first water tank (4) set to a water temperature of about 45° to 60° C., preferably about 50° C. and taken up in ribbon form on a first takeup unit (5). This ribbon (6) is passed through a first stretching tank (7) and taken up on a second takeup unit (8). In the first stretching tank (7), the ribbon (6) is heated to 85° to 100° C. with hot water or steam under a draft of 3 to 4.5. The desired stretching effect is imparted by controlling the relative speeds of the first takeup unit (5) and second takeup unit (8). The stretched ribbon (6) is further passed through a second stretching tank (9) to a third takeup unit (10). In this second stretching tank (9), the ribbon (6) is heated by dry heat, the source of which may be an electric heater or a preheated air, to a high temperature of 250° to 350° C. and, at the same time, is stretched at a draft of 1.2 to 1.5. The total lengthwise draft should be in the range of 4.6-6. If the draft is less than 4.6, the product band will not have a sufficient strength and this lack of strength is particularly evident when the draft is less than 3. If, on the other hand, the draft exceeds 6, the band will suffer a longitudinal cracking or break.

The ribbon (6) thus stretched in two stages is now in the form of band (15) which is then preferably embossed by means of an embossing roll (11). This embossing treatment randomizes or otherwise distorts the longitudinal molecular orientation. The randomized band (15) is passed through a heat treatment tank (12) in which it is heat-treated by dry heat at 180° to 280° C. The band (15) is then cooled in a second cooling tank (13) and taken up on a windup unit (16) via a fourth take-up unit (14). The speed of the fourth take-up unit (14) is equal to, or about 5% lower than, the speed of the third take-up unit (10).

After the above two-stage stretching, the band (15) is heat-treated. This treatment is designed to eliminate the undulating strain due to the orientation of resin molecules and promote crystallization. The draft reduction is usually about 0 to 5% so that the band will not be subjected to undue tension while it is guided through the heat treatment tank. If the band is treated under such excess tension and taken up on a windup drum, it undergoes shrinkage on the drum which can cause trouble such as a broken core.

The physical properties of the polyethylene terephthalate band (i) produced in the above manner, a polyethylene terephthalate band (ii) produced by stretching the material resin having the same intrinsic viscosity as that of (i) in one stage, a polyethylene terephthalate band (iii) obtained by stretching a material resin with an IV value less than 0.90 in two stages and a polyethylene terephthalate band (iv) produced by stretching the resin with an IV value less than 0.90 in one stage are respectively shown in Table 1. All of the above-mentioned bands were 16 mm in width and 0.6 mm in thickness.

TABLE 1*

| Band No. | (i) | (ii) | (iii) | (iv) |
|---|---|---|---|---|
| Intrinsic viscosity (IV) of polyethylene terephthalate | 0.97 | 0.97 | 0.82 | 0.82 |
| Stretching method | Two-step | One-step | Two-step | One-step |
| Draft (times) | 1st-step 4.0<br>2nd-step 1.25<br>Total 5.0 | 4.8 | 1st-step 4.0<br>2nd-step 1.25<br>Total 5.0 | 4.8 |
| Stretching temperature | 1st-step, hot water 90° C.<br>2nd-step, dry 300° C. | Hot water 98° C. | 1st-step, hot water - 80° C.<br>2nd-step, hot water - 91° C. | Hot water 98° C. |
| Temperature of heat treatment | Dry 200° C. | Dry 250° C. | — | Dry 250° C. |
| Speed reduction | 0–5% | 0–5% | — | 0% |
| Strength Kg | o 488 | 402 | 408 | 394 |
| Kg/mm² | 50.8 | 41.8 | 42.5 | 41.0 |
| Elongation % | 11.9 | 10.9 | 12.7 | 10.5 |
| Sealing strength Kg | o 449 | Δ 352 | x 315 | x 314 |
| Shrinkage,* % | o 0.30 | Δ 0.80 | x 4.70 | Δ 0.85 |
| Weather resistant % (strength retained after 2 years of outdoor exposure) | o 98 | o 95 | Δ 85 | Δ 84 |
| Longitudinal cracking** | | | | |

*Shrinkage: after standing at 60° C. for 24 hours
**o - Not cracked; Δ - Partially cracked; x - Cracked As will be seen from Table 1, the polyethylene terephthalate (PET) band according to this invention is superior in tensile strength, sealing strength and weathering quality and does not undergo longitudinal cracking.

Because a PET resin with a high intrinsic viscosity is employed, the band according to this invention is highly heat-sealable and has an increased strength without a tendency toward longitudinal cracking. As the PET resin is stretched at a temperature over 150° C., the axial orientation and crystallization of the resin progresses to yield a greater strength. In the two-stage stretching process of this invention, crystallization at right angles with the fiber axis (first stage) and crystallization along the fiber axis take place in substantially distinct steps, and since a step for removing the residual strain (heat treatment after stretching) is provided, the band has an increased strength without a tendency toward longitudinal cracking and a reduced tendency toward shrinking at elevated temperatures. As regards the weather resistance of the band, is strength is not significantly affected by two years of outdoor exposure, thus demonstrating the advantage of the band according to this invention over conventional plastic bands.

It is very important to take note in the practice of this invention that if the PET resin obtained by polycondensation of terephthalate resin obtained by polycondensation of terephthalic acid and ethylene glycol contains water in hot fused condition, the PET is hydrolyzed and its viscosity lowered, with the result that the quality of products is adversely effected. Therefore, usually the PET resin is dried in a drying hopper equipped with a dehumidifying device at about 150° C. for more than about 4 hours so as to reduce the moisture content of the resin up to 0.20%.

Table 2 shows the physical properties of the bands produced by the method of this invention (see Table 3) under various states of dryness of the raw material (PET resin). Product ① corresponds to the raw material (PET resin) dried in a dehumidifying hopper at 150° C. for 4 hours as in the example of this invention. Product ② corresponds to said resin with a moisture content of 0.05% or more and which has been dried in the same dehumidifying hopper at 150° C. for 30 minutes. Product ③ corresponds to said raw material with a moisture content of 0.005% or less which has been dried in vacuo at 150° C. for 6 hours and vacuum-extruded.

There is a large difference in intrinsic viscosity of products (bands) according to the degree of dryness of material resin. Even with a raw material with an IV value of 0.90 or less, the decrease of intrinsic viscosity can be minimized by improving the dryness of the PET resin. Thus, in physical properties, the product is comparable with one produced from a raw material with an intrinsic viscosity of 0.95 or more. It is thus clear that the quality of products depend not only on the intrinsic viscosity of raw material but also on the intrinsic viscosity of the products themselves.

In the conventional drying method, the decrease of viscosity of 8 to 10% is inevitable in the extrusion process. However, the viscosity reduction can be held within 5% by such procedures as vacuum drying-vacuum extrusion, prolongation of drying time, a minimization of resin stagnation in the extrusion cylinder and die, etc.

These are why, in the practice of this invention, it is essential to use a polyethylene terephthalate resin material with an IV value of 0.90 to 1.20 and to ensure that the IV value of the formed product be not less than 0.80.

The packing band of this invention is especially suited for the packing of heavy products. Particularly in an automatic packing line, the desirable heat-sealing quality of the packing band of this invention helps to increase the work efficiency to a considerable measure. Moreover, the band can be left standing outdoors for long periods of time. Thus, the packing band of this invention is commercially very useful. The production method according to this invention ensures production of the band with efficiency and high productivity.

The intrinsic viscosity (IV) of polyethylene terephthalate (PET) used in the above-reported runs or examples was determined by the following method, which is also the method used to determine IV recited in the claims presented infra:

A 0.2 g (±1 mg) portion of PET resin was weighed and placed in a flask. 40 ml (±0.1 ml) of a 1:1 (by weight) mixture of phenol and 1,1,2,2-tetrachloroethane thermostated at 20−1° C. was added thereto from a buret.

TABLE 2*

| PRODUCT | PACKING BANDS | | |
|---|---|---|---|
| | ① | ② | ③ |
| Method of drying the raw material | Drying hopper with dehumidifier - 150° C., 4 hrs | Drying hopper with dehumidifier - 150° C., 30 min | Vacuum-drying hopper and vacuum extrusion - 150° C., 6 hrs |
| % Moisture of material | <0.02% | >0.05% | <0.005% |
| IV of material | 0.97 | 0.97 | 0.93 |
| IV of product | 0.88 | 0.82 | 0.89 |
| Strength, Kg | o 488 | x 394 | o 480 |
| Elongation, % | 11.9 | 11.2 | 11.4 |
| Sealing strength, Kg | o 449 | x 286 | o 451 |
| Strinkage,** % | o 0.30 | o 0.25 | o 0.30 |
| Weather resistance % (strength retained after 2 years of outdoor exposure) | o 96 | Δ 88 | o 96 |
| Longitudinal cracking*** | | | |

*See Table 3 for stretching conditions used to prepare packing bands described in this Table
**Shrinkage: after standing at 60° C. for 24 hours
***o - Not cracked; Δ - Partially cracked; x - Cracked

TABLE 3*

| Stretching Method | Two-step stretching | |
|---|---|---|
| Draft (times) | One-stage | 4.0 |
| | Two-stage | 1.25 |
| | Total | 5.0 |
| Stretching temperature | One-stage | Hot water, 90° C. |
| | Two-stage | Dry, 300° C. |
| Temperature of heat treatment | Dry, 250° C. 3% speed reduction | |

*Table 3 represents the operating (stretching) conditions used to prepare the packing bands shown in Table 2.

The flask containing the mixture was placed in an oil bath thermostated at 135±5° C. and the mixture in the flask stirred to prepare a sample solution. Immediately after dissolving, the resulting solution was cooled in a water bath thermostated at 20±1° C. After cooling, the solution was filtered using a glass filter, said filter having a volume of 30 ml and meeting Japanese Industrial Standard 1G1. The filtrate was subjected to efflux time measurement at an accuracy of 0.01 second using an Ubbelohde autoviscometer that was placed in a constant temperature bath maintained at 20±0.01° C. A blank test was performed using the same procedure with a 1:1 (by weight) mixture of phenol and 1,1,2,2-tetrachloroethane free of PET resin.

The intrinsic viscosity (IV) was calculated by the following equation which is an emprirical equation for calculating the IV value in a 6:4 (by weight) mixture of phenol and 1,1,2,2-tetrachloroethane from the efflux time obtained by the above mentioned procedure:

$$IV = 1.451 t/to - 1.369$$

where: t is the efflux time for the solution of PET in said 1:1 mixture of phenol and 1,1,2,2-tetrachloroethane; and to is the efflux time for the blank (said 1:1 mixture of phenol and 1,1,2,2-tetrachloroethane) to pass through said Ubbelohde autoviscometer.

What is claimed:

1. A method of producing a polyethylene terephthalate packing band which comprises melt-extruding through an extrusion die a polyethylene terephthalate dried to a moisture content of up to 0.02% and having an intrinsic viscosity of 0.90 to 1.20, cooling the molten resin into a first water tank to give a ribbon, subjecting the ribbon to first-stage stretching at a temperature of 85° to 100° C. to a draft of 3 to 4.5 times and to second-stage stretching at a high temperature of 250° to 350° C. to give a total cumulative longitudinal draft of 4.6 to 6 times.

2. A method of producing a stretched polyethylene terephthalate packing band which comprises melt-extruding through an extrusion die a polyethylene terephthalate resin having a moisture content of up to 0.02% and an intrinsic viscosity of 0.90 to 1.20, cooling the extruded resin in a water tank to form a cooled ribbon, stretching the cooled ribbon in a first stretching tank in which the ribbon is heated to 85° to 100° C. with hot water or steam and subjected to a longitudinal draft of 3 to 4.5 times; stretching the ribbon from the first stretching tank in a second stretching tank in which the ribbon is heated to 250° to 350° C. with dry heat and subjected to a longitudinal draft of 1.2 to 1.5 times to form a stretched ribbon that has been subjected to a total cumulative longitudinal draft of 4.6 to 6 times, and heat-treating the stretched ribbon by passing it through a heat-treating tank at 180° to 280° C. at a take-off speed such that the thickness reduction rate is 0 to 5% to form the stretched polyethylene terephthalate packing band.

* * * * *

UNITED STATES PATENT AND TRADEMARK OFFICE
CERTIFICATE OF CORRECTION

PATENT NO. : 4,451,422

DATED : Issued: May 29, 1984

INVENTOR(S) : YUI et al

It is certified that error appears in the above-identified patent and that said Letters Patent is hereby corrected as shown below:

On the title page inventors should read:
--(75) Inventors: Ryosuki Yui; Keisuke Kume; Masaaki Hashi, all of Neagarimachi; Junji Niikura, Kanazawa, all of Japan --.

Signed and Sealed this

Twenty-third Day of April 1985

[SEAL]

Attest:

DONALD J. QUIGG

Attesting Officer

Acting Commissioner of Patents and Trademarks